Patented Aug. 4, 1953

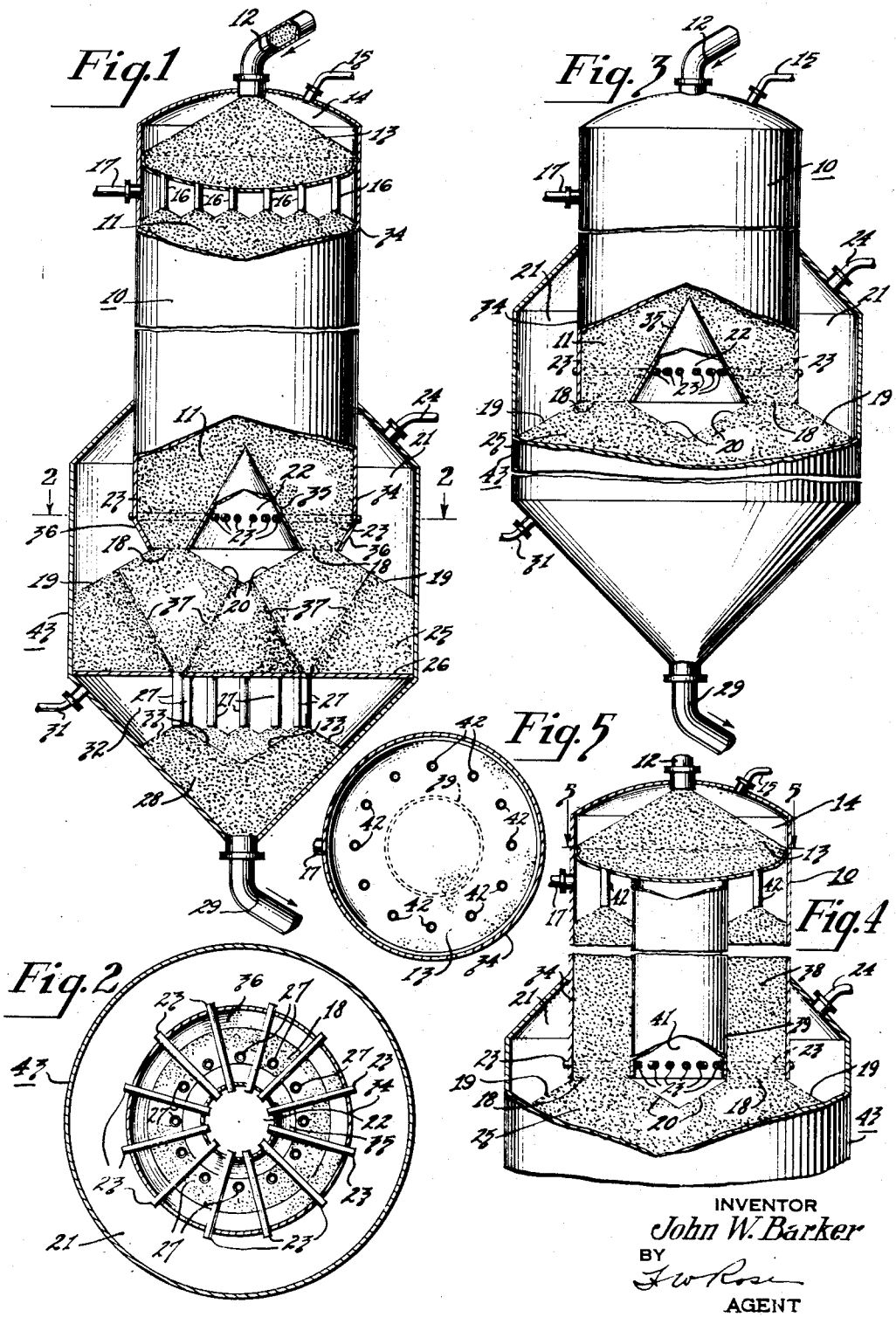

2,647,859

UNITED STATES PATENT OFFICE 2,647,859

PROCESS AND APPARATUS FOR THE DISENGAGEMENT OF GASES FROM FLUENT SOLID PARTICLES IN THE CONVERSION OF HYDROCARBONS

John W. Barker, Silver Spring, Md., assignor to Houdry Process Corporation, Philadelphia, Pa., a corporation of Delaware Application March 12, 1949, Serial No. 81,202

6 Claims. (Cl. 196—52)

The use of moving bodies of fluent solid particles in processes that involve the contact of masses of such solid particles with fluids, as, for example, catalytic conversions of organic vapors by solid catalysts, has resulted in considerable advantages due to the continuous nature of the process but has also created problems arising from the inherent characteristics of such processes and of solid particles in such a fluent state. One such problem involving the disengagement of gas flowing concurrently through a downwardly moving bed of fluent solid particles in a contact zone may be overcome using methods and apparatus embodying the present invention.

The general technique for use of downwardly moving non-turbulent bed of fluent solid particles as contact masses is set forth in the technical literature (see, for its application to the catalytic cracking of hydrocarbons, an article entitled "The 'T. T. C.' Cracking Process for Motor Gasoline Production" by R. H. Newton, G. S. Dunham and T. P. Simpson, "Transactions of the American Institute of Chemical Engineers," volume 41, page 215, April 25, 1945, and the articles there cited and for its application to the use of fluent inert particles for pyrolytic conversions, an article entitled "Thermo for Pyrolytic Cracking" by S. C. Eastwood and A. E. Potas, "Petroleum Processing," vol. 3, page 837, Sept. 1948).

Recent investigations have shown that it is often desirable in such processes to flow the gas downwardly through the moving contact mass at high gaseous velocities. In many cases, these gaseous velocities attain a magnitude such that, if the gaseous flow were upward, the downward flow of solid particles would be disturbed to such an extent as to result in stoppage of the flow of solid particles and/or disruption of the bed with resulting turbulence, channelling of the gas and similar effects. These effects have been capably discussed in a recent patent (U. S. Patent No. 2,439,348, issued April 6, 1948, to T. P. Simpson, R. E. Lee and F. E. Ray). The cited patent points out the advantages of multistage disengagement under conditions such that the disengaging surfaces provide a substantially greater area than the horizontal cross sectional area of the bed of solid particles in the contact zone. The present invention may be considered an improvement on the methods and apparatus described in the cited patent and, like the cited patent, is useful in connection with a wide variety of processes. However, the present invention will, for convenience and brevity, be described in terms of hydrocarbon conversion processes, particularly cracking; those skilled in the art will be able to apply the process and apparatus set forth herein to other fields and uses.

The present invention is a solution of the problem encountered at high gaseous velocities in systems of the type referred to herein. Because the disengagement of gas from the fluent particles involves the formation of free surfaces of the particles and a reversal of flow of the gas so as to pass upwardly through the free surfaces so formed, it is obvious that ordinary methods of disengagement would result in entraining excessive amounts of the particles in the disengaged gas.

The problem of high gaseous velocities becomes particularly important when hydrocarbon cracking systems are operated advantageously at high catalyst to oil ratios, such as four or more. It then becomes desirable and highly advantageous to employ concomitantly higher space velocities than have previously been customary in commercial moving bed systems for equal conversions. (The catalyst to oil ratio as used herein is the ratio of the weight rate of admission to the cracking zone of catalyst to that of the hydrocarbons; the space velocity is the volume rate of admission of hydrocarbons to the cracking zone, on a condensed basis (i. e., the volume of the hydrocarbons in a liquid state at 60° F. charged per hour) divided by the volume of catalyst instantaneously present in the cracking zone.) It clearly follows from the above definition that the higher the space velocity, the smaller the volume of catalyst present in the conversion zone. When space velocities above 1, such as from about 2 to 4 or more, are used, this effect must be considered in the design of reactor vessels.

If such a small amount of catalyst is disposed in a deep bed of very small horizontal area, the pressure drop through such a bed is impractically high. If a relatively short, shallow bed of relatively large cross sectional area is employed, unequalities in the upper surface of the bed (or the profile) caused by feeding the solid particles as one or more columns of catalyst to the upper surface of the bed (see Figure 1) result in unequalities of considerable magnitude in space velocities through various sections of the bed with resulting inefficiencies and mechanical disturbances in operation. Indeed, care must be taken lest the amount of catalyst is only sufficient to fill the disengaging section. Moreover, shallow beds require that considerable precision in fixing the bed depth be exercised in order to obtain a desired space velocity and hence a desired conversion.

The above considerations render beds of intermediate horizontal cross sectional area desirable. This shape of bed results in sufficiently high gas velocities through the bed as to cause the attendant difficulties that are discussed in the cited patent. It therefore often becomes necessary, in order to avoid entrainment of the solid particles in the disengaged gases, to employ a total disengaging surface substantially greater than the horizontal cross sectional area of the bed in the conversion zone.

As shown in the cited patent, disengaging surfaces may be developed by a plurality of sets of multiple inverted troughs or sets of catalyst discharge conduits (a set of such conduits discharge catalyst to a bed below so as to form an upper free surface to the bed and thus form what is known as a plenum chamber), these sets being placed at a plurality of vertical levels. If multilevel disengagement is used, the total hydrocarbon vapors traverse only a fraction of the bed before some vapors are disengaged; more and more vapors are disengaged as the remainder of the vapors progress downwardly through the bed. In contrast to such a condition, it is obviously desirable from the standpoint of uniformity of conversion conditions to have as much of the vapors as possible contact all of the bed. Moreover, if a plurality of levels of catalyst discharge conduits are used, the amount of pressure drop therethrough may be sufficiently high as to create problems in other sections of the refinery.

On the other hand, if the catalyst in the bed in the reaction zone is discharged therefrom and thereafter expanded outwardly to form disengaging surfaces which are the frusto-conical upper free surfaces of a bed of increased diameter (as, for example, in U. S. Patent No. 2,400,194 issued on May 14, 1946, to R. B. Day et al.), the vessel containing such a bed must have an inconveniently large diameter if the disengaging surfaces so formed have an area, which, when projected on a horizontal plane, is greater than the horizontal cross sectional area of the bed in the reaction zone. Increasing the diameter of the vessel increases the difficulty of fabrication and shipping; this effect must be considered for commercial sized vessels lest it become prohibitive. Also entrainment of catalyst in the disengaged vapors can occur with such an arrangement, particularly at high velocities.

Such entrainment occurs because the greatest disengaging load (and highest gaseous pressure) exists in the uppermost portion of the disengaging surface (i. e. the portion of the disengaging surface adjacent to the periphery of the lowermost boundary of the reaction zone). So pronounced is this effect that a condition is readily reached where further increase in the area of the disengaging surface by increasing the vertical height (and diameter) of the frusto-conical disengaging surface does not increase its disengaging capacity.

The present invention furnishes methods and apparatus, as described more fully below, for overcoming the difficulties encountered when it is desired to disengage gas flowing downwardly through a downwardly moving non-turbulent bed of fluent solid particles in a contact zone under conditions described herein. In a broad aspect, such a method involves discharging said fluent solid particles as an annular stream of said particles from the contact zone, and forming disengaging surfaces having a total area that, when measured by projection on a horizontal plane, is greater than the horizontal cross sectional area of the bed in the contact zone by expanding said annular stream of particles both inwardly and outwardly while said particles move generally downwardly. The gas flowing downwardly in the contact zone passes through said annular stream of particles and is thereafter disengaged from the particles at the disengaging surfaces so formed.

The principles involved in the present invention are set forth in detail below in connection with the description of the drawings in which various embodiments of the present invention are shown. It is to be understood that these embodiments are to be regarded as illustrating this invention rather than restricting its scope.

In the drawings:

Figure 1 is a vertical view of a vessel containing a moving bed of solid particles contacted by gases, with portions of the vessel broken away for a better view of the relationship of the parts, and illustrates a preferred embodiment of the invention;

Figure 2 is a transverse section of the vessel illustrated in Figure 1 taken along the lines 2—2, showing the relationship of the parts of the apparatus at this level;

Figure 3 is a vertical view of a portion of a vessel illustrating another embodiment of the invention, with parts of the vessel broken away for a better view of the relationship of the parts.

Figure 4 is a vertical view of a portion of a vessel illustrating yet another embodiment of the invention, with a portion of the vessel broken away for a better view of the relationship of the parts.

Figure 5 is a transverse section of the vessel illustrated in Figure 4 along the lines 5—5, showing the relationship of the parts of the apparatus at this level.

Shown in Figures 1, 3 and 4 is a closed housing or vessel indicated generally at 10, which housing contains a contact, reaction or cracking chamber or zone generally coextensive with a bed of solid particles 11. Fluent solid particles in the size range of from about 50 mesh to about 0.5 inch and comprising solid hydrocarbon conversion catalyst, such as acid activated montmorillonite clay, synthetic silica-alumina gel in pellet or bead form or other solid refractory compositions known by those skilled in the art to be hydrocarbon cracking or conversion catalysts, are introduced to housing 10 by means of conduit 12 and form, as shown in Figure 1, a bed 13 in catalyst manifolding or introduction chamber 14 as shown. As is known to the art, a sealing gas may be introduced to chamber 14 by conduit 15.

Particles in bed 13 flow from chamber 14 through conduits 16 (which are arranged to give even distribution of the particles over the horizontal cross sectional area of bed 11) and thereafter move downward through bed 11 in compact non-turbulent downward flow. Hydrocarbons in vapor form may be introduced by a conduit 17 and thereafter flow downwardly through bed 11 concurrently with the downwardly moving particles of catalyst. If desired, arrangements can be made at the top of bed 11 for introducing liquid hydrocarbons and contacting them with particles of catalyst by known methods and apparatus.

In accordance with the invention, the fluent solid particles of catalyst are discharged from the conversion zone through annulus 18 as an annular stream of particles and form disengaging surface 19 by expansion of the annular stream of particles outwardly and disengaging surface 20 by expansion of the annular stream inwardly while the particles move generally downwardly, all as described more fully below. Hydrocarbon vapors passing downwardly through the bed discharge from the conversion zone (which is considered as extending from annulus 18 to the top of bed 11) through annulus 18 and through the annular stream of particles, pass therethrough and thereafter reverse the direction of their flow so as to pass through disengaging surfaces 19 and 20, at which surfaces the vapors are disengaged from the particles of catalyst. After disengagement, the vapors flow upwardly, those disengaged from surfaces 19 passing into peripheral gas collection space or chamber 21 and those from surfaces 20 into a central gas collection space or chamber 22. Vapors in the central chamber 22 flow through conduits 23 to chamber 21 from which they are removed together with the vapors already in the chamber, through conduit 24. (Although only one conduit 24 is shown, a plurality of such conduits, appropriately spaced apart around the periphery of the housing and manifolded, may be used.)

The particles of catalyst, after expanding inwardly and outwardly, merge to form a bed 25 above plate or tube sheet 26. The particles in bed 25 flow downwardly through catalyst discharge conduits or nipples 27 which depend vertically from plate 26. The streams of particles discharged through conduits 27 expand and merge to form a bed 28 and thereafter flow out of housing 10 through and by means of conduit 29.

The particles of catalyst, which have accumulated a hydrocarbonaceous deposit (or coke) by reason of the contact with hydrocarbons in the conversion zone, may be desirably purged of the volatile portion of such deposit by a purging gas introduced by conduit 31. The purging gas, which may be steam, spent flue gases and the like, flows throughout the lateral extent of chamber 32, enters the upper surfaces 33 of bed 28, passes upwardly through conduits 27 and bed 25 and disengages from the fluent particles at disengaging surfaces 19 and 20. The purging gas, together with vapors purged or removed from the particles of catalyst by its action, mingles with the hydrocarbon vapors in chambers 21 and 22, all of these gases being removed from the housing as described above.

The wall of the conversion chamber 34 (which wall is preferably metallic, such as steel, and which may be appropriately insulated inside and out) confines bed 11 and hence defines the form or shape and extent of the horizontal cross section of the bed. As shown in Figures 1, 3 and 4, wall 34 (or at any event, that portion of the wall defining the conversion chamber) is generally vertically cylindrical in shape. In the embodiments shown in Figures 1 and 3, the horizontal cross section of bed 11 is continuous (i. e., extends without interruption from one wall to another wall on the other side of the vertical axis) and the particles of catalyst in bed 11 gravitate or move downwardly in smooth even flow from the top of bed 11 to an intermediate level (as represented in the specific embodiments in Figures 1 and 3) defined by the top or apex of upwardly tapered conical member or cone 35 which is positioned concentrically within the conversion chamber. Below this intermediate level in the bed, the particles in the horizontally central portion of bed 11 flow divergently outward from the vertical axis of the bed because of the effect of conical member 35. Member 35, by its action, provides space for and defines the top of the central gas collection space or chamber 22.

Moreover, conical member 35 is positioned so that its bottom (and outer edge) is at substantially the same level as the bottom of wall 34 and cooperates with the wall in effecting the formation of annulus 18 through which the particles discharge from bed 11. As can be seen from the drawings, the arrangement provides for and permits the expansion of the annular stream of particles both inwardly and outwardly to form disengaging surfaces 19 and 20. By such an arrangement, a large amount of disengaging surface is created at the expense of a minimum pressure drop, since the hydrocarbon vapors flow unobstructedly from the top of the bed to the intermediate level; thereafter there is only a minor diminution of the area through which the vapors must pass.

When the angle of conical member 35 (i. e., the angle defined by the side and the base of cone) is desirably approximately the same as the angle of flow of the fluent particles employed, there is little or no static body of particles above the conical member. (As pointed out in the Newton et al. article cited above, particles discharging from a large bed through a small circular orifice tend to flow freely only in inverted frustoconical region thereabove, which region coincides with the orifice at the bottom. The angle with the horizontal of the periphery of this inverted frusto-conical region of free or unhindered flow is referred to as the angle of flow.) Prevention of a static body of particles in a hydrocarbon conversion zone is desirable and often essential, since such bodies tend to accumulate excessive amounts of coke, which is liable to lead to damage to the particle on regeneration, or may even result in building up an immobile fused mass of highly coked particles. The angle of flow for common materials of the type herein described (which generally have angles of repose between about 27° and about 37°) is generally between about 55° to about 75°.

The above considerations obviously do not apply where coking or similar effects on the particles is unimportant or non-existent, as in processes where gases contact particles under non-reactive conditions.

In the event that coking is not a problem and/or lower pressure drop is desired, the amount of diminution in area can be reduced by substantially decreasing the angle of conical member 35 below the angle of flow of the fluent particles. However, if this is done, it is preferred to maintain a minimum angle of about 30°, since below this value, the static body of particles may cause trouble.

In the specific embodiment shown in Figures 1 and 2, the lowermost portion or element 36 of wall 34 projects inwardly (i. e., has an inverted frusto-conical shape). Element 36 may be an integral portion of wall 34 which has been bent, as by forging, toward the axis of the cylindrical wall or it may be a separate piece, appropriately shaped, which is affixed, as by welding, to the cylindrical wall. The tapered portion 36 of the wall of the chamber causes the peripheral portion of the particles in bed 11 to converge inwardly to the vertical axis of the bed and aids in the formation of annulus 18 and is desirably inclined in the same general fashion as explained above in connection with conical member 36.

In one aspect of the embodiment shown in Figures 1 and 2, smooth and uniform flow of both vapors and fluent particles within the conversion zone is obtained by designing the apparatus so that the horizontally projected areas below the central diverging and peripheral converging streams of particles are substantially equal so that equal amounts of particles flow in the annulus from the sides which, together with the flow of particles directly above the annulus, constitute the annular stream. In this instance, the areas of tapered portion 36 and conical member 35 are equal when projected on a horizontal plane. Annulus 18 is thereby nearer to wall 34 (extended) than to the vertical axis of bed 11.

As stated above, the annular stream of particles emerging from the conversion expands inwardly and outwardly while moving generally downward as a compact moving bed 25. In an aspect of the invention shown in Figures 1 and 2, the particles in bed 25 flow out or discharge from bed 25 through conduits 27 as a plurality of compact columns of particles (i. e., the flow of particles is continuous and the particles are in a non-turbulent state). As shown in Figures 1 and 2, conduits 27 and hence the compact columns therein are located vertically below approximately the center of annulus 18 and are regularly and symmetrically arranged around the circular locus of said center. It is preferred that conduits 27 be placed in relation to annulus 18 so as to obtain equal flow of particles from the central and from the peripheral portions of bed 25 in the disengagement chamber. Also, conduits 27 are spaced below the annulus so that the annular stream is within the region of unhindered or relatively free flow above these conduits as illustrated by dotted lines 37 in Figure 1. Such an arrangement effects smooth and regular flow of the particles from the conversion zone.

In the embodiment shown in Figures 4 and 5, the bed 38 of particles in the conversion zone is annular in horizontal cross section. Cylindrical member 39, which is of smaller diameter than cylindrical wall 34 and is positioned concentrically in respect thereto with the bottom of both cylinders at substantially the same vertical level, serves not only as one boundary of bed 38, and provides a gas collection space or chamber 41, similar to and used for the same purpose as chamber 22, but also cooperates with wall 34 to form annulus 18. The bottom of the catalyst introduction chamber 14, to which bottom cylinder 39 is affixed, as by welding, serves as the top of chamber 41 and closes the top of the chamber so as to prevent the escape of gas therein.

Conduits 42, which, like conduits 16, serve to transfer particles from bed 13 to the bed in the conversion zone, are arranged in a simple, regular pattern; their locus being a circle concentric with the center of bed 38 and chamber 14. One of the advantages of the apparatus is that, because of the location of conduits 42 and the shape and relative location of bed 38, segregation of particles of unequal sizes is minimized.

All of the embodiments illustrated involve a chamber, indicated generally at 43, which is of larger diameter than the diameter of the conversion zone or of the cylindrical wall 34; the lower portion of this chamber extending below and the upper portion extending above the bottom of the conversion zone. Chamber 43 surrounds and communicates with annulus 18 thereby providing means to contain and confine bed 25 (tube sheet 26 forming the bottom of chamber 43). Also the chamber is shaped and positioned so as to cooperate with wall 34 in forming and defining disengaging surface 19 and the peripheral gas collection space or chamber 21.

It is apparent on inspection of the drawings that, in the embodiments illustrated in Figures 3 and 4, the amount of the difference between the diameters of chamber 43 and of wall 34 determines the extent or amount of the area of disengaging surface 19. (In the embodiment illustrated in Figure 1, the placement of annulus 18 also has an additional effect on the extent of surface 19.) Similarly, it is apparent that the diameter of conical member 35 determines the extent of the area of surface 20. As brought out above, the sum of the area of peripheral surface 19 and that of the central surface 20 determines the disengaging capacity of the apparatus, these areas conveniently being referred to or measured by their projection on a horizontal plane. The amount of the sum of the areas of surfaces 19 and 20 should be designed to accommodate the total disengaging load (as measured, for example, by the pounds per hour of vapors to be disengaged) and sufficient area provided so that boiling or turbulence of the particles at the disengaging surface is avoided. For example, a loading of hydrocarbon vapors that would cause a pressure drop of between about 4.0 to about 6.0 inches of water in passing through a bed one foot thick is a convenient design figure.

In apportioning the total area between surfaces 19 and 20, another factor, the vertical height of these surfaces, merits consideration. When the vertical heights of these surfaces are approximately equal, the tops of the surfaces being, as shown in the drawings, in the same horizontal plane, approximately the same pressures are exerted at the respective lowermost surfaces and both surfaces can operate at maximum efficiency. In accordance with one aspect of the invention, the geometry of the apparatus is designed so that the vertical heights of surfaces 19 and 20 are approximately the same; at the same time giving due consideration to the other design factors stated herein.

However, if, for other reasons, the vertical height of the central disengaging surface 20 is less than that of peripheral surface 19, conical member may be moved a short distance downwardly to compensate for the effect of pressure. In this connection, it is preferred that conduits 23 be of such diameter as to cause little or no substantial pressure drop in the gases passing therethrough; but, if such pressure drop cannot be avoided, conical member 35 may be moved upwardly slightly to compensate therefor.

In general, it is preferred to arrange the various portions of apparatus so that annulus 18 has a substantial area such as preferably 30 percent or more of the area of the bed in the conversion zone prior to any diminution in area. However, as shown in the embodiment in Figure 4, the area of the annulus and that of the bed may be the same. Thus, for example, in Figure 1, the area of the annulus may be about one third of the area of the bed at the top of the conversion zone and the horizontally projected areas of members 35 and 36 may be also one third of the area of the bed at the top.

With the above factors in mind, one who is skilled in the art can design an apparatus suitable for use with specific materials by varying the various factors of design appropriately in conformity to the physical properties of the specific materials handled.

Obviously many modifications and variations of the invention as hereinbefore set forth may be made without departing from the spirit and scope thereof and therefore only such limitations should be imposed as are indicated in the appended claims.

I claim as my invention:

1. In a hydrocarbon conversion process wherein gaseous hydrocarbons are passed concurrently downward through a compact bed of granular contact material gravitating through a contact zone, the method for disengaging said gas from said contact material which comprises flowing said contact material, at least at the lower end of said contact zone, as a confined annular stream, discharging said annular stream of contact material from said contact zone directly into a disengaging zone, said annular stream expanding both outwardly and inwardly upon discharge to form an enlarged bed of horizontally continuous cross-sectional area, the outwardly flowing and the inwardly flowing portions of said annular stream having exposed upper surfaces which form, respectively, the lowermost boundaries of a confined peripheral gas-collecting space and a confined central gas-collecting space, said exposed upper surfaces having a total horizontally-projected area substantially greater than the maximum cross-section area of the bed within said contact zone, passing the gas collected in said central gas-collecting space laterally outward as a confined stream through said annular stream into said peripheral gas-collecting space, discharging the total disengaged gas from said peripheral gas-collecting space, and discharging said contact material from the lower end of said expanded bed.

2. In apparatus for the contact of gas with fluent solid particles continuously passing through a contacting chamber, the combination of an upper vertical shell closed at the top and open at the bottom, which shell defines said contacting chamber and is adapted to contain a downwardly moving non-turbulent bed of particles, means for introducing gas under pressure to the top of said bed, means for continuously introducing said particles to the top of said chamber while confining said gas under pressure to said chamber, a lower vertical shell in spaced overlapping relation to and encompassing the lowermost portion of said upper shell with the top of said lower shell joined to the outermost periphery of said upper shell so that the lowermost portion of said upper shell and the uppermost portion of said lower shell define a peripheral gas collection chamber in unobstructed gaseous communication with the entire periphery of the bottom of said upper vertical shell, means for removing gas from said peripheral gas collection chamber, means for continuously removing solid particles from said lower shell, means for introducing sealing gas below the bottom of said contacting chamber, and means adapted to provide a central gas collection chamber positioned concentrically within the bottom region of said upper vertical shell, and a plurality of conduits extending radially from said central gas collection chamber to said peripheral gas collection chamber.

3. The combination of claim 2 characterized in that said upper vertical shell is cylindrical in horizontal cross section through the vertical extent of the portion that is in contact with said bed.

4. The combination of claim 2 characterized in that the lowermost portion of said upper vertical shell tapers toward the vertical axis of said shell.

5. In apparatus for the contact of gas with fluent solid particles continuously passing through a contacting chamber, the combination of an upper vertical shell which shell defines said contacting chamber and is adapted to contain a downwardly moving non-turbulent bed of particles, means for continuously introducing gas to said chamber, means for continuously introducing said particles to the top of said chamber, a lower vertical shell in spaced overlapping relation to and encompassing the lowermost portion of said upper shell with the top of said lower shell joined to the outermost periphery of said upper shell to thereby form an outer peripheral disengaging space, means for discharging an annular stream of particles from said chamber, said means forming an inner peripheral disengaging space, a horizontal tube sheet in said lower vertical shell spaced below said means for discharging an annular stream of particles, and a plurality of conduits depending vertically downward from said tube sheet, the upper ends of said conduits being positioned vertically below and regularly around the annulus through which said particles discharge.

6. Apparatus as defined in claim 2 wherein said means adapted to provide a central gas collecting chamber comprises a hollow cylindrical member extending centrally upward through said downwardly moving bed of particles.

JOHN W. BARKER.

References Cited in the file of this patent

UNITED STATES PATENTS

| Number | Name | Date |
|---|---|---|
| 1,115,268 | Akerlund | Oct. 27, 1914 |
| 2,429,545 | Bergstrom | Oct. 21, 1947 |
| 2,439,348 | Simpson et al. | Apr. 6, 1948 |
| 2,487,961 | Angell | Nov. 15, 1949 |